Nov. 1, 1966 N. O. ROSAEN 3,282,428
MULTIPLE FILTER DEVICES
Filed April 23, 1965
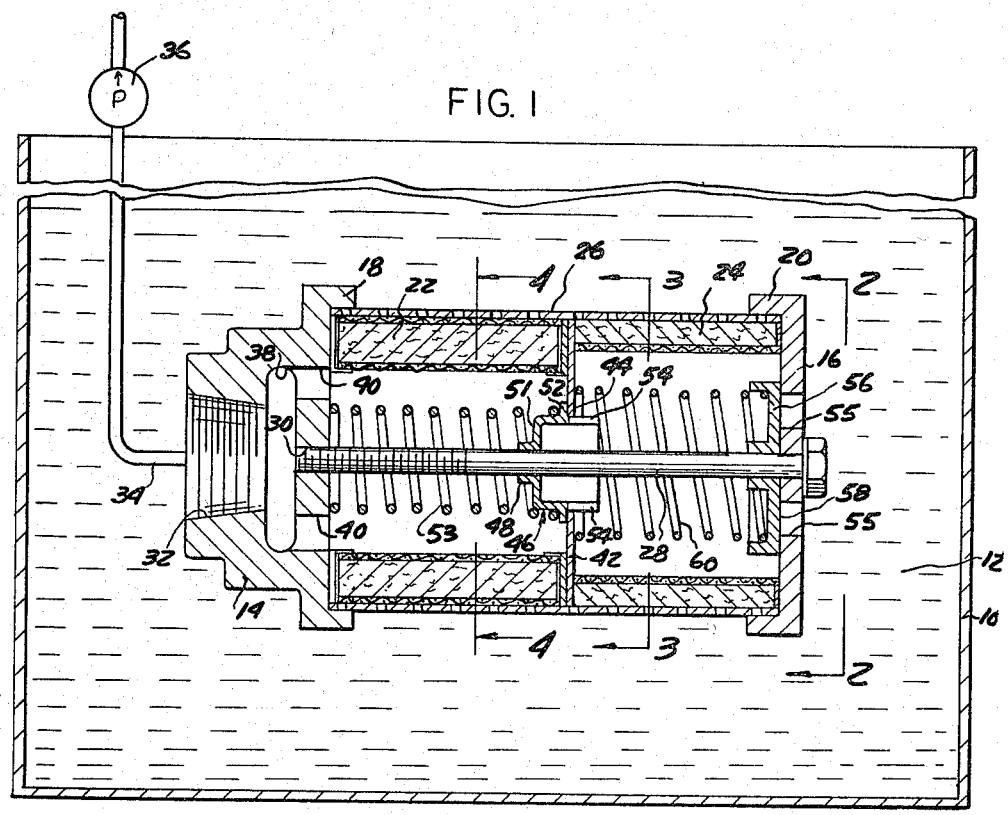
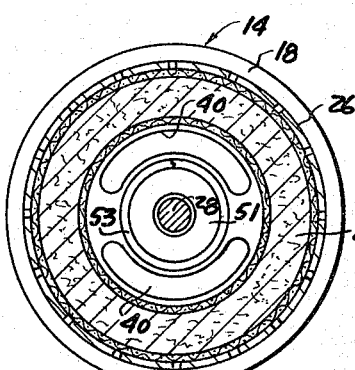
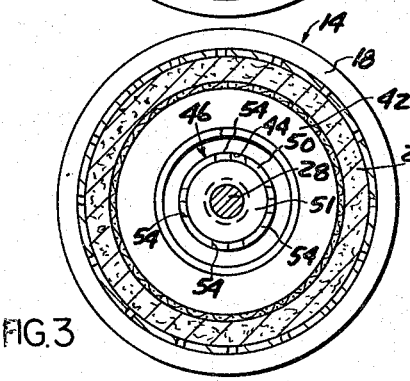
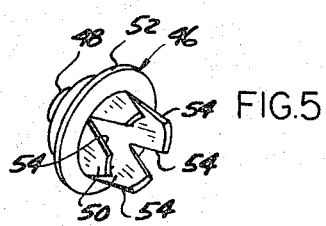
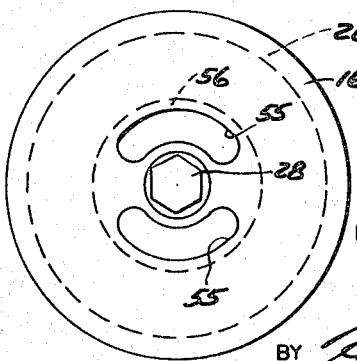
INVENTOR
NILS O. ROSAEN
BY *Hauke & Hauke*
ATTORNEYS _United States Patent Office_

3,282,428
Patented Nov. 1, 1966

3,282,428
MULTIPLE FILTER DEVICES
Nils O. Rosaen, Bloomfield Hills, Mich., assignor to The Rosaen Filter Company, Hazel Park, Mich., a corporation of Michigan
Filed Apr. 23, 1965, Ser. No. 450,494
9 Claims. (Cl. 210—132)

The present application is a continuation-in-part application of my copending application Serial No. 274,705, filed April 22, 1963.

The present invention relates to a filtering device having a plurality of filtering elements, particularly to such a device adapted to be submerged in a fluid reservoir during use and more particularly to such a device having means operable to variably increase fluid flow through secondary filter elements as a primary filter element becomes clogged to thereby maintain a substantially constant outlet pressure and a substantially constant flow rate through the filter device.

Heretofore it has been difficult to maintain a substantially constant outlet pressure and flow rate through a filter device over long periods of operation. As the filter element becomes clogged, the outlet pressure and flow rate will gradually diminish until it is necessary to remove the filter element for cleaning or replacement.

Even in those filter devices in which means are provided for periodically cleaning the filter element in place the problem persists. To maintain a constant outlet pressure and flow rate it would be necessary to operate the cleaning means continuously. Even if this were practical it has been found that optimum filtration is produced at some condition of the filter element intermediate fully cleaned and fully clogged and this optimum would never be achieved with a filter element which is continuously being cleaned.

The present invention provides a filter device in which a plurality of filter elements are provided. Valve means are disposed intermediate the filter elements and are operable to variably open fluid flow through secondary filter elements only as the primary filter element becomes clogged. The valve means are actuated in response to changes in the pressure differential across the primary filter element so that as outlet pressure and flow rate decreases new filtering areas are opened and a substantially constant outlet pressure and flow rate are maintained.

Filter devices have been heretofore disclosed in which a plurality of filter elements are provided. U.S. Patent No. 2,998,138 issued to R. J. Mould et al. on Aug. 29, 1961 and U.S. Patent No. 2,617,535 issued to M. H. Hamilton on November 11, 1952 disclose such filter devices. In each of these filter devices, however, no attempt is made to maintain a constant outlet pressure and a constant flow rate and since the valve means disposed intermediate the filter elements are not constructed to provide a variable regulation of fluid flow through the elements they will not in fact produce such a result. In each the valve means are constructed to provide substantially full fluid flow upon a predetermined decrease in outlet pressure.

My copending application Ser. No. 186,075, filed April 9, 1962, now Patent No. 3,224,583, issued December 21, 1965 discloses a filter device having a plurality of filter elements. Unlike the filter device of the present invention, however, the filter elements are mounted within a housing structure and are secured to an assembly which is axially movable within the housing and upon movement actuates the valve means. The present device provides considerable improvement over the device of my copending application by providing a multiple filter device which is adapted to be submerged in a fluid reservoir. This eliminates the need for a housing structure.

It is an object then of the present invention to improve filter devices by providing such a device having a plurality of filter elements and means variably opening fluid flow through secondary filter elements as the primary element becomes clogged to thereby maintain a substantially constant outlet pressure and flow rate through the device.

It is still another object to improve such filter devices by providing a simply and economically constructed filter device adapted to be submerged in a fluid reservoir during use.

It is another object of the present invention to prevent the rupture of filter elements in multiple filter devices by providing pressure responsive means operable to open a bypass around the filter elements as they become clogged.

It is still another object of the present invention to maintain a substantially constant flow rate and outlet pressure for filter devices by providing a construction for such a device which permits a plurality of filter elements of varying porosity to be utilized and valve means operable to variably open fluid flow through the coarser filter elements as the finer filter elements become clogged.

Still further objects and advantages will readily occur to one skilled in the art to which the invention pertains upon reference to the following drawings in which like reference characters refer to like parts throughout the several views and in which—

FIG. 1 is a view illustrating a preferred filter device of the present invention in longitudinal cross section and showing schematically a portion of the fluid system utilizing the filter device of the present invention.

FIG. 2 is an end view as seen substantially from line 2—2 of FIG. 1.

FIG. 3 is a cross sectional view taken substantially from line 3—3 of FIG. 1.

FIG. 4 is a cross sectional view taken substantially on line 4—4 of FIG. 1, and

FIG. 5 is a perspective view of a preferred valve member for the filter device of the present invention.

Now referring to the drawings for a more detailed description of the present invention a preferred filter device is illustrated in FIG. 1 as being submerged in a reservoir 10 containing fluid 12. The filter device preferably comprises a first annular member 14 and a second annular member 16. The annular members 14 and 16 are provided with axially extending flanges 18 and 12 respectively.

The flanges 18 and 20 provide the means by which cylindrical first and second filter elements 22 and 24 respectively are sandwiched between the first annular member 14 and the second annular member 16 in an axially aligned and axially spaced position. A perforated cylindrical shell 26 is carried by the annular members 14 and 16 and encompasses the filter elements 22 and 24. An elongated bolt 28 extends axially through the second annular member 16 and the filter elements 22 and 24 and is received by an axial threaded bore 30 provided in the first annnular member 14.

The first annular member 14 is provided with an axially extending outlet 32 which is adapted for connection with an outlet pipe 34. The outlet pipe 34 preferably extends exteriorly of the reservoir 10. A fluid pump 36 is preferably connected with the outlet pipe 34. The first member 14 is provided with an annular outlet chamber 38 communicating with the outlet 32. Arcuate slots 40 are provided in the first annular member 14 to provide communication between the outlet side of the first filter element 22 and the outlet chamber 38.

A circular wall 42 is positioned intermediate the filter elements 22 and 24 and is provided with a circular central opening 44 axially aligned with the shank of the bolt 28 as can best be seen in FIGS. 1 and 3. A substantially cylindrical valve member 46 is provided with a reduced diameter portion 48 which axially slidably receives the bolt 28. As can best be seen in FIGS. 1 and 3, an enlarged diameter portion 50 of the valve member 46 is dimensioned to be axially slidably received in the opening 44 to block fluid flow therethrough. A radially extending annular portion 51 connects the reduced portion 48 and the enlarged portion 50. A medial radially outwardly extending flange portion 52 is provided on the outer surface of the enlarged portion 50 and provides the seat for one end of a spring 53. The spring 53 encompasses the bolt 28 and has its opposite end seated against the first annular member 14 to urge the valve member 46 axially along the bolt 28 and into the opening 44. The flange portion 52 limits inward axial movement of the valve member 46.

As can best be seen in FIGS. 3 and 5, the enlarged portion 50 of the valve member 46 is provided with a plurality of axially elongated annularly spaced slots 54. The slots 54 are preferably formed to decrease in width from the free end of the portion 50 so that they are substantially V-shaped when viewed in elevation.

The second annular member 16 is preferably provided with arcuate inlet openings 55 as can best be seen in FIGS. 1-2. A circular valve plate 56 is slidably carried on the shank of the bolt 28 and is provided with a circular face portion 58 of sufficient diameter to close the inlet openings 55. A spring 60 seats against the wall 42 and urges the valve plate 56 toward the annular member 16 to close the inlet openings 55.

In the embodiment illustrated, the filter element 22 is provided with a fine porous surface preferably between 10 and 20 microns and the filter element 24 is somewhat coarser for example from 74 to 149 microns. The spring member 53 is somewhat weaker than the spring member 60. For example, in the embodiment illustrated the spring member 53 preferably exerts a force of a value permitting the valve member 46 to move in the opening 44 axially toward the annular member 14 when a pressure differential of about 2 p.s.i. has been produced across the filter element 22 and thus across the radial portion 51 of the valve member 46 by clogging of the filter element 22 while the spring 60 exerts a force of a value permitting the valve plate 56 to move away from the openings 55 when a pressure differential of about 4 p.s.i. has been produced across the filter element 24 by clogging.

In operation, when both filter elements 22-24 are clean, the springs 53 and 60 will urge the valves 46 and 56 respectively to the closed positions and fluid will be pumped by the pump 36 through the perforations in the shell 26, through the filter element 22 and out the outlet port 32. The valve member 46 will prevent any substantial fluid flow from the outlet side of the filter element 24 to the outlet port 32 but since it does not provide a completely fluid tight fitting some leakage past the valve member 46 will occur for reasons which will become more apparent as the description proceeds.

As the fine filter element 22 becomes clogged, the pressure on the outlet side of the filter element 22 will decrease and the flow rate through the device will decrease slightly. This will produce an increase in the pressure differential across the filter element 22 and thus across the radial portion 51 of the valve member 46. The increase in the pressure differential will cause the valve member 46 to move axially to a position opening fluid flow through a portion of the slots 54. The slots 54 are dimensioned and the spring member 53 is calculated to variably increase fluid flow through the opening 44 and thus through the filter element 24 to maintain a substantially constant outlet pressure and flow rate through the device.

Since the valve member 46 is not fluid tight against the wall 42 and a small amount of flow will occur past the valve member 46 even when the filter element 22 is clean, the filter element 24 will become partially clogged as the filter element 22 is being used. Thus when the valve member 46 moves to a fully opened position, a cake will have formed on the surface of the filter element 24 which will in effect slowly transform it into a fine filter element. Again this results in a filter device in which a substantially constant outlet pressure is maintained since there is no sudden increase in outlet pressure as the filter element 24 is opened to full use.

After the valve member 46 has opened and both filter elements 22-24 are in use and as the elements continue to become clogged for the first time there will be a noticeable decrease in outlet pressure. The resulting pressure differential across the valve plate 56 will cause the valve plate 56 to move toward an opened position. Thus when the pressure differential has reached a predetermined value and before the filter elements 22-24 are in danger of rupturing the valve plate 56 will have moved to a position opening a bypass path directly from the reservoir 10 through the inlet opening 55 to the outlet 32.

To vary the range of permissible outlet pressure it is only necessary to vary the dimensions and width of the slots 54 or to vary the force of the spring member 53. To vary the amount of clogging permitted with both filter elements functioning it is only necessary to vary the force of the spring member 60.

It is apparent that the construction of the filter device of the present invention lends itself to an arrangement wherein any number of filter elements can be used and all that would be necessary would be to replace the bolt 28 with one of greater length and provide the desired number of walls, valve members, and springs similar to those described.

It is also apparent that a filter device has been described which is much more economically manufactured than the device of my heretofore mentioned copending application. Further, since there is no housing member, the number of filter elements which can be provided is not limited by the interior dimensions of a housing structure.

Further, unlike the devices of the aforementioned patents the valve member of the present invention is operable to variably and gradually increase fluid flow through the secondary filter elements so that a substantially constant outlet pressure and fluid flow rate through the device is maintained until all filter elements are in full use.

It is also apparent that although I have described but one embodiment of the present invention many changes and modifications can be made therein without departing from the spirit of the invention as expressed by the appended claims.

I claim:
1. A filter device adapted to be connected to an outlet pipe and to be submerged in a fluid reservoir, said device comprising
  (a) a filter carrier structure submerged in said reservoir and having an outlet adapted for connection to said outlet pipe,
  (b) said carrier structure comprising a first annular member and a second annular member,
  (c) a first filter element and a second filter element carried by said structure intermediate said annular members and each having an inlet side exposed to the fluid in said reservoir and an outlet side communicating with said outlet.
  (d) a normally closed valve means carried by said structure intermediate the outlet sides of said filter elements and operable to regulate fluid flow from the outlet side of said of first filter element in response to changes in the pressure differential between the outlet sides of said filter elements, and
  (e) said valve means comprising a rod carried by said carrier structure and securing said annular members together and said filter elements therebetween, a wall carried by said carrier structure intermediate said first filter element and said second filter element and having an opening therein, a valve member comprising a hollow body normally extending into said opening and having a closed end opposite sides of which are exposed to the outlet sides of said filter elements, a shoulder portion on the outer surface of said body axially spaced from said closed end, and a plurality of annularly spaced slots extending axially from the open end of said body to a point adjacent said shoulder portion, and biasing means engaging said shoulder portion and normally urging said body toward a position in which said shoulder portion engages said wall to close fluid flow through said opening.

2. The filter device as defined in claim 1 and in which said slots have decreasing widths from the free end of said body toward the closed end thereof.

3. The filter device as defined in claim 1 and including a bypass means carried by said structure and operable to open a fluid path bypassing said filter elements upon the pressure differential across said filter elements reaching a predetermined value.

4. The filter device as defined in claim 3 and in which said bypass means comprises,
   (a) a second inlet provided in said structure and communicating with the outlet side of said second filter element,
   (b) a second valve member carried by said structure and means urging said second valve member toward a position closing said second inlet.

5. The device as defined in claim 3 and in which said bypass means comprises
   (a) an inlet provided in said structure and providing communication between said reservoir and the outlet side of said second filter element,
   (b) a second valve member slidably carried on said rod and a second biasing means urging said second valve member toward a position closing said inlet.

6. The filter device as defined in claim 5 and in which said first mentioned biasing means exerts a force on said first mentioned valve member of a lesser value than the force exerted by said second biasing means on said second valve member whereby upon an increase in the pressure differential across said filter elements said first mentioned valve member will be moved toward an open position before said second valve member will begin to move toward an open position.

7. The filter device as defined in claim 5 and in which said first mentioned biasing means comprises a spring seated against said first annular member and urging said first mentioned valve member toward said wall.

8. The filter device as defined in claim 7 and in which said inlet is provided in said second annular member and in which said second biasing means comprises a spring seated against said wall and urging said second valve member toward said second annular member.

9. The filter device as defined in claim 8 and in which the force exerted by said second mentioned spring is greater than the force exerted by said first mentioned spring.

References Cited by the Examiner

UNITED STATES PATENTS

| | | | |
|---|---|---|---|
| 334,011 | 1/1886 | Franklin | 137—625.3 X |
| 619,569 | 2/1899 | Hewell | 210—450 X |
| 2,605,904 | 8/1952 | Ogilvie | 210—132 |
| 2,617,535 | 11/1952 | Hamilton | 210—132 |
| 2,868,382 | 1/1959 | Best | 210—130 X |
| 2,998,138 | 8/1961 | Mould et al. | 210—90 |
| 3,120,490 | 2/1964 | Samson | 210—433 X |

RUBEN FRIEDMAN, *Primary Examiner.*

F. A. SPEAR, *Assistant Examiner.*